March 24, 1942. L. A. TAYLOR 2,277,464
RADIO LOCATING AND FOLLOWING SYSTEM
Filed Dec. 13, 1938
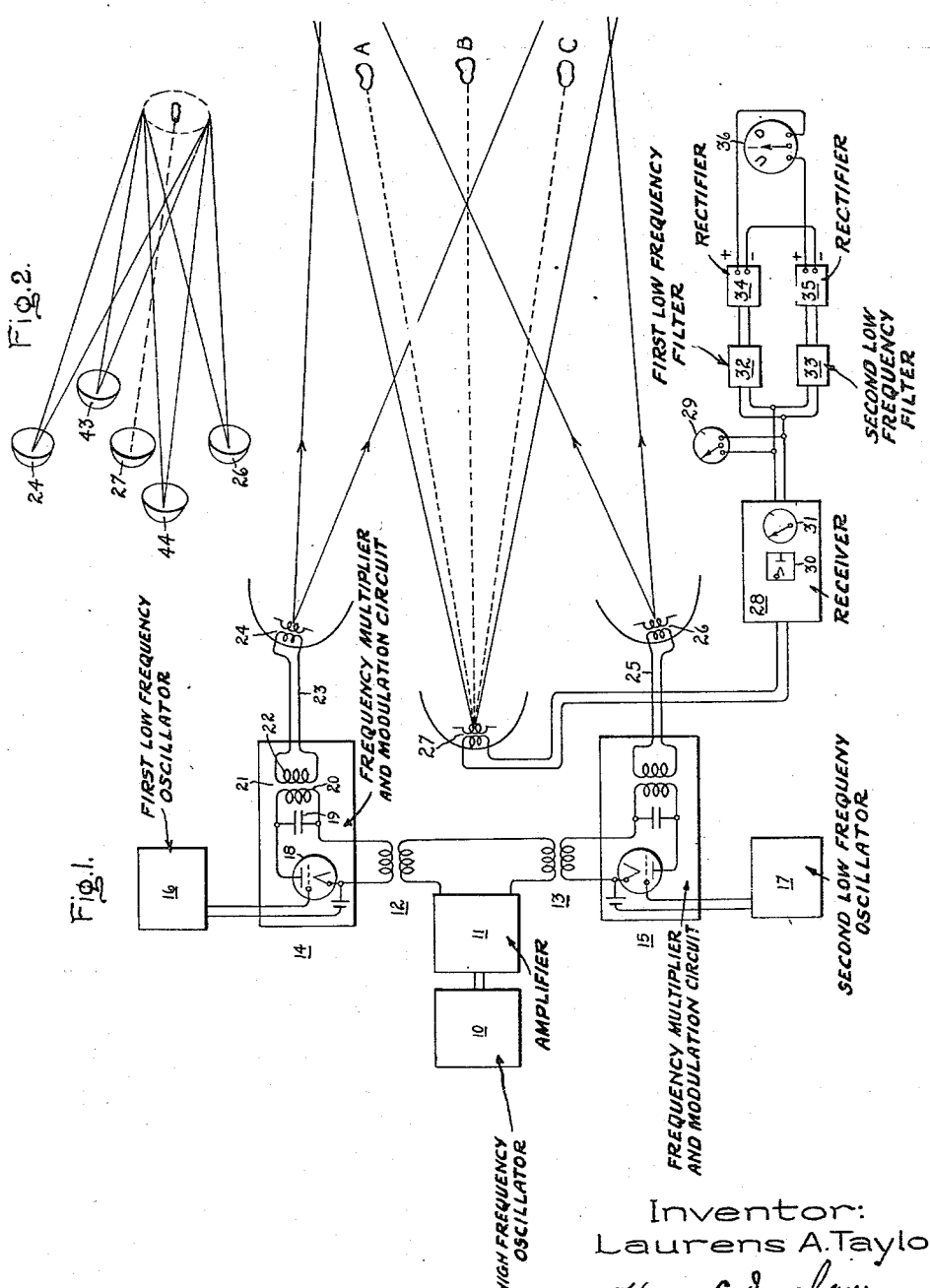
Inventor:
Laurens A. Taylor;
by Harry E. Dunham
His Attorney.

Patented Mar. 24, 1942

2,277,464

UNITED STATES PATENT OFFICE 2,277,464

RADIO LOCATING AND FOLLOWING SYSTEM

Laurens A. Taylor, Schenectady, N. Y., assignor to General Electric Company, a corporation of New York Application December 13, 1938, Serial No. 245,451

5 Claims. (Cl. 250—1)

This invention relates to a method and apparatus for locating and following a distant object by means of ultra-short radio waves. It is particularly adapted to locating the direction of and following aircraft in flight.

Ultra-short radio waves can be propagated only in substantially straight lines in a uniform medium. Most physical objects have the property of reflecting or refracting such waves to an appreciable extent. It is an object of this invention to provide an improved method and means for utilizing these reflecting properties in locating and following a distant object.

It is a further object of this invention to provide an improved method and apparatus which by the use of more than one transmitted beam of radio waves indicates more accurately the direction of an object with respect to the observer. It is also an object of this invention to provide apparatus which indicates the direction in which such apparatus should be moved in order to point directly at the distant object.

In the practice of this invention several sources of ultra-high frequency radio waves, of the type which produce sharply focused beams, are mounted adjustably to emit beams at a definite angle with relation to each other. Receiving apparatus, preferably of a directional nature, is situated so as to collect any portion of the transmitted beams which may be reflected by the distant object, which is to be located and followed. The transmitted beams are given distinguishable characteristics, and the receiving apparatus is constructed to indicate the total amount of reflected energy as well as the difference in amounts between the received portions of the distinguishably characterized beams.

The novel features which I believe to be characteristic of my invention are set forth with particularity in the appended claims. My invention itself, however, both as to its organization and method of operation, together with further objects and advantages thereof may best be understood by reference to the following description taken in connection with the accompanying drawing in which Fig. 1 illustrates schematically apparatus embodying the invention; and Fig. 2 shows a modification.

In Fig. 1 a high frequency current source 10 of any convenient type supplies high frequency current through a suitable amplifier 11 and transformers 12 and 13 to two similar frequency multiplier and modulation circuits 14 and 15. These frequency multiplier and modulation circuits 14 and 15 may be of any suitable type. They have two functions, one being to modulate the current supplied from source 10 at frequencies $f_1$ and $f_2$ supplied from suitable oscillators 16 and 17 respectively, and the other function being to supply current to the consumption circuit of a frequency which is a multiple of the frequency of the current supplied by source 10. The frequency multiplication is shown as being performed by a rectifier device 18 connected in series with a parallel tuned circuit comprising condenser 19 and primary 20 of coupling transformer 21. The modulation is effected by applying the modulation wave between the cathode and grid of the rectifier device 18. Of course, other frequency multipliers and modulation means may be used; for example, plate modulation means in a multiplier-amplifier circuit, in which the current supplied from source 10 is applied between the grid and cathode of the device 18.

The secondary 22 of coupling transformer 21 is connected by a transmission line 23 to a directive antenna system 24, which may be a half wave antenna with a parabolic reflector. This antenna 24 is designed to propagate a sharply focused beam of ultra-high frequency radio waves in any predetermined direction.

Since the two circuits branching from the amplifier 11 are identical, except that the oscillators 16 and 17 supply modulating waves of different frequencies, it is unnecessary to describe the construction and operation of the branch including circuit 15. The output of the coupling transfomer of circuit 15 is connected by a transmission line 25 to a directive antenna system 26, which is identical with antenna 24.

It is convenient to arrange antennas 24 and 26 one above the other upon a single adjustable mounting of any convenient form, not shown, and to provide adjustment whereby the angle between their beams may be fixed at any desired value. The mounting is provided with means whereby it may be adjusted for rotation in azimuth or elevation. As a practical matter the spacing between the antennas is negligible in comparison with the distance of the moving object. It is necessary that the angle between the beams be such that the field strength patterns do not coincide in space, or in other words that the axes of the respective beams are not coincident. A certain angle will be found which provides the greatest accuracy with which the direction of an object may be determined.

The indicating part of the apparatus includes an antenna 27, which is preferably similar to the directive antenna systems 24 and 26 but which may be any type of antenna. This antenna 27 is preferably located on the mounting upon which antennas 24 and 26 are also mounted but it may be located anywhere in fixed or dirigible position. The energy received by this antenna 27 is transmitted to an ultra-short wave receiver designated generally by 28. This receiver 28 includes suitable means for amplifying and demodulating any signals received by antenna 27 to which the receiver is tuned. It produces a current in response to reception by antenna 27 of the beams after reflection. This current represents in frequency and amplitude the energy from sources 16 and 17 after reflection by the distant object. A meter 29 is connected to the output terminals of the receiver 28 in any suitable manner, and indicates the effective value of the current thus produced by the receiver.

There may alternatively be placed in the receiver a rectifier, which is conventionally indicated at 30, to rectify the received waves, and a direct current indicator 31 may indicate the effective value of the anode current of the rectifier, thereby to indicate the intensity of these waves. Filters 32 and 33 are connected in parallel to the output terminals of receiver 28. Filter 32 is designed to transmit only currents of frequency $f_1$ and filter 33 will transmit only currents of frequency $f_2$. Rectifiers 34 and 35 convert the energy transmitted by filters 32 and 33 respectively into continuous current. A meter 36, having a center zero scale, is connected in series with the output terminals of rectifiers 34 and 35, the latter being so poled that the meter reads zero when the output voltages of rectifiers 34 and 35 are equal. When the output of rectifier 34 exceeds that of rectifier 35, the indicator of meter 36 moves to the left, indicating U, as shown on the drawing. Conversely, when the output of rectifier 35 exceeds that of rectifier 34, the indicator of meter 36 moves to the right, indicating D, as shown on the drawing.

Meter 36 as shown operates in response to the difference in intensity of the two currents of frequencies $f_1$ and $f_2$. Of course, it is understood that a ratio meter may be used in place of the differential meter 36 to measure the ratio of the currents at the outputs of the two filters 32 and 33, rather than the difference, if desired. It has been found, however, that such arrangements are relatively less sensitive than that above described.

In operation antennas 24 and 26 continuously emit beams of energy modulated respectively at frequencies $f_1$ and $f_2$. The antenna 27, and its reflector, are oriented so that it receives reflected energy from an object in either or both of the transmitted beams. These transmitted beams are directed so that their field strength patterns do not coincide but lie one above the other. When no energy is received by antenna 27, both meters 29 (or 31) and 36 indicate zero. When a distant body comes within the beam transmitted from antenna 24, as indicated at A on the drawing, a portion of the beam transmitted from antenna 24 is reflected to antenna 27, as indicated by the dotted line. Meter 29 (or 31) indicates the reception of a certain amount of energy. Since this energy is modulated at frequency $f_1$, filter 33 prevents its transmission, while filter 32 allows such energy to pass. The continuous current from rectifier 34 causes meter 36 to indicate U which means that the system of the three antennas 24, 26, and 27, should be turned angularly upward.

When the distant object is in such a position as to reflect only waves from antenna 26 as indicated at C on the drawing, meter 29 (or 31) indicates the amount of energy received and filter 32 prevents passage of this energy, while filter 33 allows its transmission, since the modulation frequency is $f_2$. The rectifier 35 produces a continuous current and influences meter 36 to indicate D which means that the system of the three antennas 24, 26, and 27, should be turned angularly downward.

When the distant object is within the space traversed by waves from both antennas 24 and 26, as indicated at B on the drawing, waves are reflected to antenna 27 from each source as indicated by the dotted line. Meter 29 (or 31) as before indicates the total energy received. Filters 32 and 33 respectively allow current of frequencies $f_1$ and $f_2$ to pass. Rectifiers 34 and 35 produce direct voltages which influence meter 36 oppositely. When the direct voltage produced by rectifier 34 is greater than that produced by rectifier 35, the meter 36 indicates U, which as before means that the antenna system should be rotated upwardly. Conversely, when the direct voltage produced by rectifier 35 is greater than that produced by rectifier 34, the meter 36 indicates that the antenna system should be rotated downwardly. The magnitude of the movement required is indicated by the amount of deflection of meter 36. Thus by changing the orientation of the different antenna systems so as to keep the index of meter 36 at the center of its scale, the movement of the distant object may readily be followed.

It is, of course, understood that a certain amount of radiation is received by antenna 27 directly from antennas 24 and 26. If sufficient leakage radiation exists to blanket the radiation reflected from the distant object, it is desirable to provide means whereby such leakage radiation may be neutralized at the receiving antenna 27.

A suitable arrangement for effecting the cancellation or neutralization of leakage radiation at antenna 27 is one in which antenna 27 is placed at such a point in the radiation field of antennas 24 and 26 that the phases of the respective leakage radiations from antennas 24 and 26 are exactly opposite to each other. This is possible because the antennas 24 and 26 are excited by sources which bear a constant relation to each other in phase and amplitude. Points where such an effect is present are termed nodes and may be determined by any suitable means well known in the art. Such nodes may be found at points which differ in distance from the two wave sources by any odd multiple, preferably one, of a half wave length. Hence no such point of phase cancellation can be found at a point equidistant from the two radiating antennas 24 and 26. Therefore, it is desirable that a point be chosen as nearly equidistant from these two antennas as possible. Of course, nodes may be found in the fields formed by more than two synchronous wave sources. This method is equally applicable. If it be desired to effect complete cancellation at such a point, except for side bands introduced by modulation, the amplitude of the radiation from antennas 24 and 26 is regulated so that leakage is equal in amplitude at the receiving antenna 27. Of course, if such regulation is undertaken the beams from antennas 24 and 26 are of unequal intensity and meter 36 must be calibrated accordingly. This calibration of meter 36 may be conveniently avoided by making the percentage modulation of the beam of greater amplitude smaller than the percentage modulation of the beam of reduced amplitude, in the same ratio as the ratio of amplitudes of the two beams. It is preferred to let the radiation from antennas 24 and 26 remain equal and to place antenna 27 at a considerable distance from antennas 24 and 26 so that it will be nearly equidistant therefrom.

Although the preferred embodiment of my invention is described and illustrated, many modifications will suggest themselves to those skilled in the art. For example, two additional transmitting antennas, positioned with respect to the antennas 24, 27 and 26 as indicated at 43 and 44 in Fig. 2, may be employed. These antenna systems are like antennas 24 and 26 and may be arranged to propagate beams having field strength patterns which lie symmetrically with respect to device 27 and side by side in a horizontal plane. These beams may be modulated at two additional frequencies. Filters and rectifiers like those shown may indicate the difference in amounts of energy received by antenna 27 from these two additional antennas on an additional meter such as meter 36, which indicates whether the antenna system is to be rotated in azimuth. The moving object may then be followed with great ease both vertically and horizontally without depending on the use of meter 29 (or 31) to indicate orientation in azimuth.

Other types of directional antenna may be used. Many additional modifications will suggest themselves to meet various conditions of operation.

While I have shown a particular embodiment of my invention, it will, of course, be understood that I do not wish to be limited thereto, since different modifications may be made both in the circuit arrangements and instrumentalities employed, and I contemplate by the appended claims to cover any such modifications as fall within the true spirit and scope of my invention.

What I claim as new and desire to secure by Letters Patent of the United States is:

1. In combination, a plurality of electromagnetic radiators producing superimposed fields of waves bearing a substantially constant relation to each other in phase and amplitude, means for maintaining said radiators stationary with respect to each other at such positions that there are nodes of minimum energy in said fields, a receiver responsive to waves of the frequency of waves from said radiators, means spaced from said radiators for directing radiant energy of such frequency toward said receiver, and means for maintaining said receiver stationary with respect to said radiators at one of said nodes in said fields and at a point other than a nodal point with respect to radiant energy from said directing means and either of said radiators.

2. In combination, means to project a pair of radio beams of the same frequency into space in such directions that a portion of each beam falls upon a distant object, a receiver arranged to receive the radiation of said beams after reflection from said distant object, and means for maintaining said receiver permanently positioned at a node of the radiation of said beams whereby said receiver is unresponsive to direct radiation from said means and responds to radiation thereof only after reflection from said object.

3. In a device for determining the direction of a distant object from a desired point, a plurality of electromagnetic radiators producing superimposed fields of waves bearing a substantially constant relation to each other in phase and amplitude, means for maintaining said radiators stationary with respect to each other at such positions that there are nodes of minimum energy in said fields, a receiver responsive to waves of the frequency of waves from said radiators, means at said object for directing radiant energy of such frequency toward said receiver, and means for maintaining said receiver stationary with respect to said radiators at one of said nodes as nearly equidistant from said radiators as possible and at a point other than a nodal point with respect to radiant energy from said directing means and either of said radiators.

4. In a system for determining the direction of a distant object from a desired point, means for emitting from said point a plurality of radiation beams, means for directing toward said object a portion of each of said beams which varies in intensity at a relatively high rate with change in angular direction from said point, means for maintaining said radiation beams fixedly oriented with respect to each other in such positions that nodes exist in the superimposed fields of such radiation, a receiver responsive to waves of the frequency of said beams, and means for maintaining said receiver at one of said nodes, whereby said receiver responds substantially only to said beams after reflection from said distant object.

5. In an apparatus for determining the direction of a distant object from a desired point, a generator of high frequency waves, a plurality of directional radiators connected to be energized from said generator and arranged simultaneously to project individual overlapping beams of radiation having non-coincident axes, means distinctively to modulate the radiation projected from each of said radiators, means for maintaining said radiators stationary with respect to each other in such positions that nodes exist in the superimposed fields of such radiation, a receiver arranged for measurement of the relative amounts of energy received from each beam, and means for maintaining said receiver at one of said nodes whereby said receiver responds substantially only to said beams after reflection from said distant object.

LAURENS A. TAYLOR.